(12) United States Patent
Abdallah et al.

(10) Patent No.: US 7,174,406 B1
(45) Date of Patent: Feb. 6, 2007

(54) SYSTEM AND METHOD FOR ARBITRATING ACCESS TO A SHARED RESOURCE

(75) Inventors: Kassem M. Abdallah, Nashua, NH (US); Ofer Michael, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 249 days.

(21) Appl. No.: 10/737,305

(22) Filed: Dec. 16, 2003

(51) Int. Cl.
*G06F 12/00* (2006.01)

(52) U.S. Cl. ...................... 710/240; 710/242

(58) Field of Classification Search ............. 710/107, 710/110, 112, 113, 116, 117, 305, 306, 240–244, 710/119–123
See application file for complete search history.

(56) References Cited

U.S. PATENT DOCUMENTS

| | | | | |
|---|---|---|---|---|
| 4,574,350 A | * | 3/1986 | Starr | ...................... 710/200 |
| 5,175,837 A | * | 12/1992 | Arnold et al. | ............... 711/152 |
| 5,341,491 A | * | 8/1994 | Ramanujan | .................. 711/152 |
| 5,872,980 A | * | 2/1999 | Derrick et al. | ............... 710/200 |
| 5,935,234 A | * | 8/1999 | Arimilli et al. | ............. 710/244 |

\* cited by examiner

*Primary Examiner*—Khanh Dang
(74) *Attorney, Agent, or Firm*—Krishnendu Gupta; Scott A. Ouellette

(57) ABSTRACT

A system for arbitrating access to a shared resource includes a plurality of microprocessors, a shared resource; and a controller coupled to the plurality of microprocessors and the shared resource by a first bus and a second bus, respectively, the controller including a register having a lock portion associated with each of the plurality of processors and at least one status portion, each of the lock portions indicating whether the associated one of the plurality of microprocessors has obtained access to communicate with the shared resource and each of the at least one status portion includes a bit indicating whether any of the plurality of microprocessors has obtained access to communicate with the shared resource.

11 Claims, 3 Drawing Sheets

SYSTEM AND METHOD FOR ARBITRATING ACCESS TO A SHARED RESOURCE

FIELD OF THE INVENTION

This invention relates generally to multiple processors computer systems and, more particularly, to a system and method for arbitrating access to a resource shared by the multiple processors.

BACKGROUND OF THE INVENTION

A data storage system can include several independent processors that cooperate to increase throughput of the many tasks associated with data storage and retrieval. These processors typically communicate with each other by leaving messages in a shared memory. This shared memory is constantly available to the processors for reading and writing.

Certain tasks performed by the processors require that each processor utilize a particular shared resource to the exclusion of the other processors. When a processor is using such a shared resource, it is important for the other processors to be informed that another processor is using the resource and that the resource is not currently available for use by the other processors.

Current systems that communicate the availability of a shared resource to the processors are software-based. As stated above, one approach to providing such communication is to enable the processors to leave messages in the shared memory. However, because the memory is shared, it is possible for a race condition between processors to occur. In such cases, one processor could inadvertently overwrite a message left by another processor. This can result in the two processors attempting to use the same shared resource at the same time.

Another approach involves requiring that a processor that is requesting access to the shared resource first check the resource to determine if it is available and then, if the resource is available, posting a claim to exclusive access to the resource. After a period of time, the processor then checks the resource to insure that it has gained access to the resource and that another processor did not gain access before the processor was able to post its claim to the resource. This process can require a significant amount of time for a processor to obtain exclusive access to the shared resource.

SUMMARY OF THE INVENTION

The present invention is directed to a hardware-based system for arbitrating access to a shared resource by a plurality of processors. The system includes a controller coupled between the multiple processors and the shared resource which informs each processor of whether the shared resource is currently being accessed by a processor and whether an inquiring processor currently has access to the shared resource.

According to one embodiment, a system for arbitrating access to a shared resource includes a plurality of microprocessors, a shared resource and a controller coupled to the plurality of microprocessors and the shared resource by a first bus and a second bus, respectively. The controller includes a register having at least a first slice and a second slice, the first slice including a bit indicating whether a particular one of the plurality of microprocessors has obtained access to communicate with the shared resource and the second slice includes a bit indicating whether any of the microprocessors have obtained access to communicate with the shared resource.

According to another embodiment, a system for arbitrating access to a shared resource includes a plurality of microprocessors, a shared resource; and a controller coupled to the plurality of microprocessors and the shared resource by a first bus and a second bus, respectively, the controller including a register having a lock portion associated with each of the plurality of processors and at least one status portion, each of the lock portions indicating whether the associated one of the plurality of microprocessors has obtained access to communicate with the shared resource and each of the at least one status portion includes a bit indicating whether any of the plurality of microprocessors has obtained access to communicate with the shared resource.

The shared resource may include a memory device. The system may include a plurality of shared resources. The register may include at least as many lock portions and status portions as there are shared resources, wherein each shared resource has a lock portion and a status portion associated therewith. Each of the lock portions may include an arbiter device which accepts lock bits input from each of the plurality of processors and outputs the lock bit of a processor that addresses the arbiter device. When a particular processor requires access to the shared resource, it may input a lock bit to the arbiter device. If no processor other than the particular processor has input a lock bit to the arbiter device, the arbiter device may accept the lock bit from the particular processor and enable the particular processor to access the shared resource. When access to the shared resources is enabled, a status bit in the status portion associated with the shared resource may be set. If a processor other than the particular processor has input a lock bit to the arbiter device, the arbiter device sets the lock bit from the particular processor to zero.

After the particular processor inputs its lock bit to the arbiter device, the particular processor may address the arbiter device to read its lock bit from the output of the arbiter device and read the status bit associated with the shared resource.

According to another embodiment, a controller for arbitrating access to at least one shared resource by a plurality of processors includes a first register portion including a plurality of layers, each of the plurality of layers being associated with a different one of the plurality of processors, each of the plurality of layers including an access indication portion associated with each of the at least one shared resource, the access indication portion holding an indicator of whether a processor associated with a particular layer has obtained access to communicate with the shared resource associated with the access indication portion of the particular layer and an access arbitration device associated with all of the access indication portions of each of the at least one shared resources for controlling access to the associated shared resource by the plurality of processors, the access arbitration device including an input for receiving access indication signals from the plurality of processors. The access arbitration device:

(A) determines whether the at least one shared resource is being accessed by any of the plurality of processors; and (B) arbitrates access to the shared resource based on the determination made in Step (A).

If a particular processor of the plurality of processors requires access to a particular one of the at least one shared resources, it may input an access indicator to the input of the access arbitration device associated with the particular shared resource and, if no other processor has access to the shared resource, as determined in Step (A), the access arbitration device grants access to the particular shared resource by the particular processor. If a particular processor of the plurality of processors requires access to a particular one of the at least one shared resources, it may input an access indicator to the input of the access arbitration device associated with the particular shared resource and, if another processor has access to the shared resource, as determined in Step (A), the access arbitration device denies access to the particular shared resource by the particular processor. The access arbitration device may grant access to the particular shared resource by the particular processor by passing the access indicator input to the access arbitration device by the particular processor to the access indication portion for the particular shared resource in the layer associated with the particular processor. The access arbitration device may deny access to the particular shared resource by the particular processor by clearing the access indicator input to the access arbitration device by the particular processor. The access arbitration device may further include a first logic device that performs Step (A) by receiving as inputs the contents of the access indication portions in all of the layers associated with the particular shared resource and outputting a signal in a first state if the shared resource is being accessed by one of the plurality of processors and in a second state if the shared resource is not being accessed by any of the plurality of processors. The access arbitration device may further include a second logic device that performs Step (B) by receiving the signal output by the first logic device and access indicator signals from the plurality of processors and outputting a signal of the first state when the output of the first logic device is of the first state and a signal of the second state when the output of the first logic device is of the second state. The first logic device may include an OR gate having its output inverted. The second logic device may include an AND gate. The access arbitration device may further include a write device that receives the signal output by the second logic device as an input and writes its input to the access indication portion of the processor that sent the access indication signal to the access arbitration device, the write device being instructed as to which access indication portion to output its input by a select signal input to the write device by the processor that sent the access indication signal to the access arbitration device. The access arbitration device may further include a read device which receives as inputs the contents of the access indication portions in all of the layers associated with the particular shared resource and reads out the contents of one of the access indication portions, the read device being instructed as to which access indication portion to read out by a read select signal input to the read device by a processor that inquires as to the contents of the access indication portion associated with the processor. The controller may further include a second register portion including a status indication portion associated with each of the at least one shared resources, each status indication portion including a status indicator which indicates whether the shared resource associated with the status indication portion is being accessed by one of the plurality of processors. In order to determine the status of a particular one of the at least one shared resources, a processor may read the status indication portion of the particular shared resource to determine whether the particular shared resource is being accessed and inputs a read select signal to the read device to instruct the read device to read out the contents of the access indication portion associated with the processor to determine whether it has access to the particular shared resource.

According to yet another embodiment, a method of arbitrating access to a shared resource by a plurality of processors, the method includes:

A) processing access indication signals received from each of the plurality of processors;

B) storing the processed access indication signals;

C) performing a logic operation on the processed access indication signals to generate an access arbitration signal;

D) receiving an access indication signal from a particular one of the plurality of processors; and E) arbitrating access to the particular processor based on the state of the access arbitration signal.

Step E may further include granting access to the shared resource by the particular processor if the access arbitration signal is of a first state. Step E may further include blocking access to the shared resource by the particular processor if the access arbitration signal is of a second state. The method may further include outputting a stored processed access indication signal for the particular processor when instructed by the particular processor, wherein the stored processed access indication signal for the particular processor indicates whether the particular processor has access to the shared resource.

BRIEF DESCRIPTION OF THE DRAWINGS

These and other features of the invention will become more readily apparent from the following detailed description when read together with the accompanying drawings, in which.

DETAILED DESCRIPTION

Figure 1:
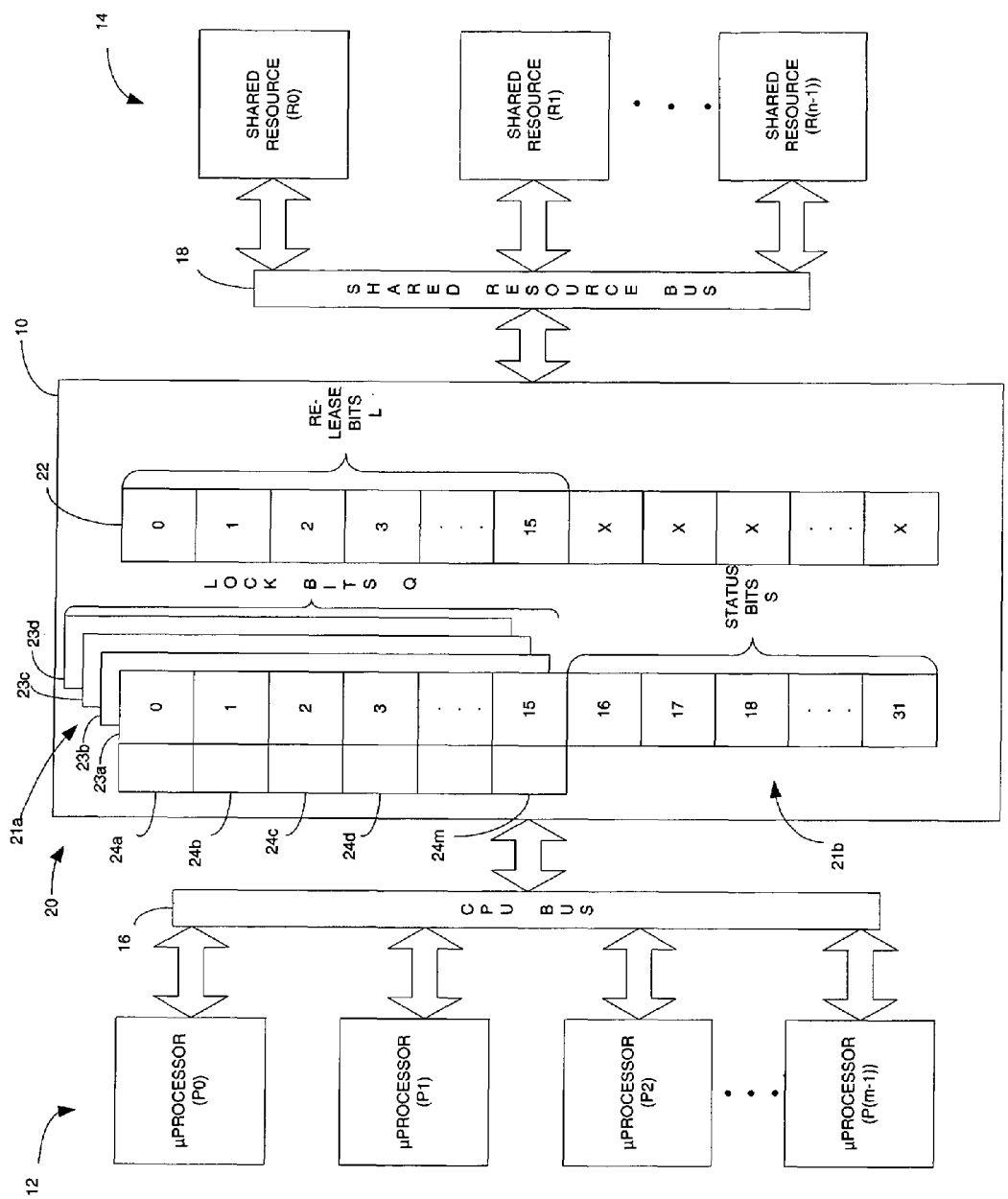
FIG. 1 is a block diagram of the system for arbitrating access to a shared resource in accordance with the present invention.

FIG. 1 is a schematic block diagram of a controller 10 for arbitrating requests by a series 12 of microprocessors P0, P1, P2 ... P(m−1), where m is the total number of microprocessors, for access to a series 14 of shared resources R0, R1 ... R(n−1), where n is the total number of resources. In the preferred embodiment of the invention, shared resources R0, R1 ... R(n−1) are memory devices to and from which the microprocessors P0, P1, P2 ... P(m−1) write and read data, respectively. However, it will be understood that shared resources R0, R1 ... R(n−1) may be any type of device to which the microprocessors compete for access. Other such devices include MII, SPI, I2C, flash memory, NVRAM, EEPROM and Ethernet devices. Each microprocessor P0, P1, P2 ... P(m−1) is coupled to the controller 10 through a CPU bus 16 and each resource R0, R1 ... R(n−1) coupled to the controller 10 through a shared resource bus 18.

Controller 10 includes a first register 20 and a second register 22. First register 20 preferably comprises a 32-bit register for holding lock bits Q and a status bit S for each of the resources R0, R1 ... R(n−1). The function of the lock bits and status bits is described below. Register 20 includes an upper register 21a having a plurality of layers 23a, 23b, 23c and 23d corresponding to each of the processors P0, P1, P2 . . . P(m−1), respectively. For each of bits 0 through 15, each layer 23a, 23b, 23c and 23d holds a lock bit Q for one of the shared resources R0, R1 . . . R(m−1). For example, bit 0 of layer 23a of register 21a holds the lock bit Q of processor P0 for shared resource R0; bit 1 of layer 23b of register 21a holds the lock bit Q of processor P1 for shared resource R1 and so on. In the preferred embodiment, the controller 10 is capable of arbitrating access between virtually any number of microprocessors and up to 16 shared resources, given that each of bits 0 through 15 of the register 20 corresponds to a separate shared resource. Register 20 also includes a lower register 21b including the remaining bits 16 through 31 of register 20, each bit holding a status bit S for one of the shared resources R0, R1 . . . R(n−1). For example, bit 16 of lower register 21b holds the status bit for shared resource R0; bit 17 of lower register 21b holds the status bit for shared resource R1 and so on.

Accordingly, for a particular shared resource Rx, where x represents a particular shared resource, Q(x) represents the particular lock bit of a particular layer (corresponding to a particular processor) of upper register 21a associated with the resource and S(x+16) represents the particular status bit of lower register 21b associated with the resource. For example, bit 0 of layer 23a of upper register 21a represents the lock bit Q of processor P0 for resource R0 and bit 16 of lower register 21b represents the status bit S for resource R0. Likewise, bit 1 of layer 23b of register 21a holds the lock bit Q of processor P1 for shared resource R1 and bit 17 of lower register 21b represents the status bit for resource R1.

While the controller 10 is described as having a first register 20 which is a 32-bit register which can support up to 16 shared resources, it will be understood that register 20 can support less than 16 shared resources, or the register could be larger than 32 bits and support more than 16 shared resources.

Register 22 is also preferably a 32-bit register. As is described below, bits 0–15 of register 22 are used to set a release bit L(x) for each of the shared resources, which releases the lock on the particular resource by the processor that currently holds the lock. Similar to register 20, for a particular shared resource Rx, where x represents a particular shared resource, bit 0 of register 22 holds the release bit for shared resource R0; bit 1 of register 22 holds the release bit for shared resource R1 and so on. Also similar to register 20, register 22 is capable of supporting up to 16 shared resources, particularly with bits 0 through 15 of the register. It will be understood that the size of register 22 may be adjusted to accommodate more shared resources.

Figure 2:
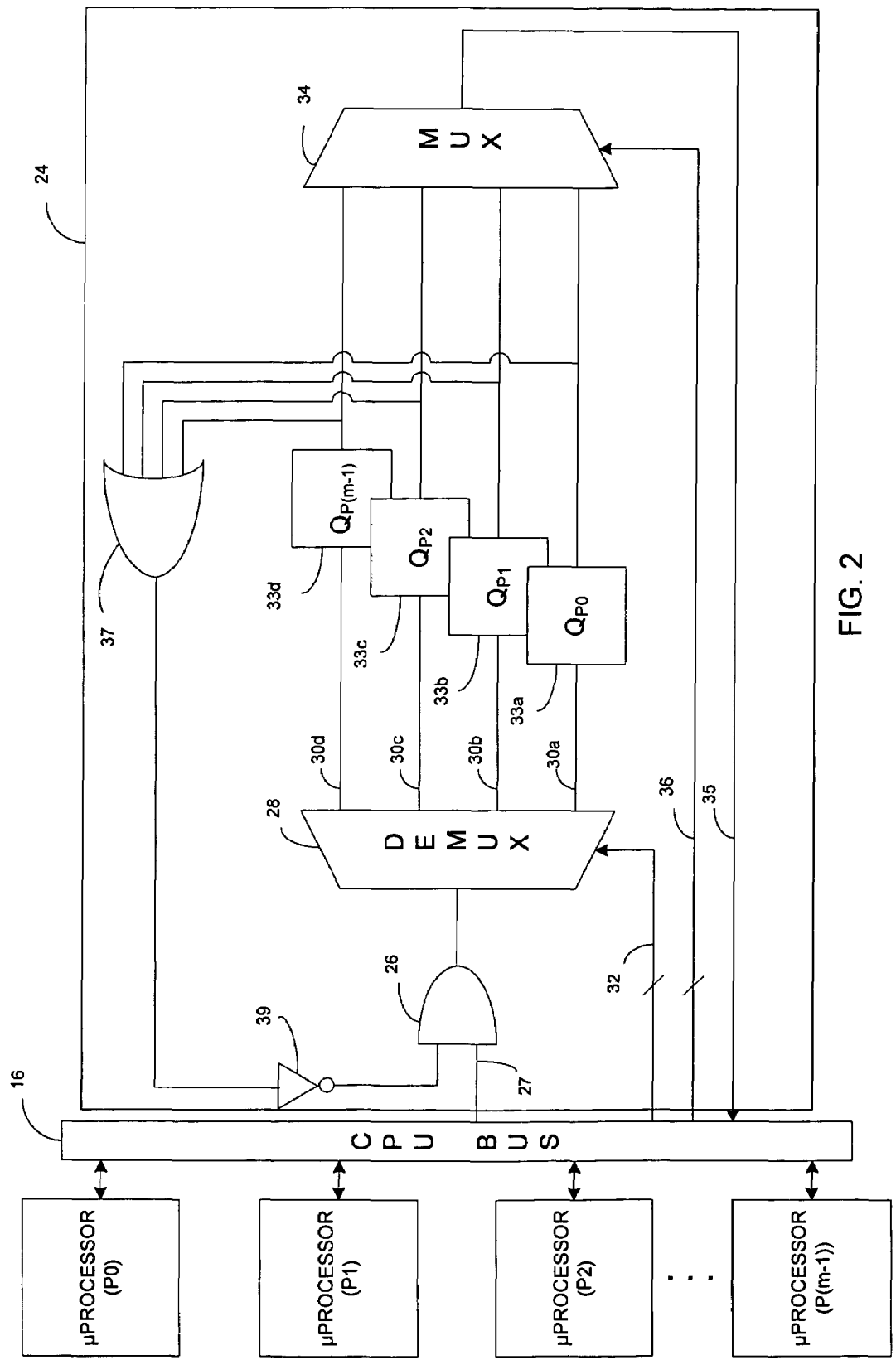
FIG. 2 is a block diagram of a lock request arbiter of the system for arbitrating access to a shared resource in accordance with the present invention.

Associated with each of the bits 0 through 15 of register 20 are lock request arbiters 24a–24m. Each of these lock request arbiters 24a–24m receive lock bits from each of the processors P0, P1, P2 . . . P(m−1) that request access to a particular resource R0, R1 . . . R(n−1). FIG. 2 is a schematic block diagram of one of the arbiters 24. Arbiter 24 includes an AND gate 26 for receiving lock bits from the processors P0, P1, P2 . . . P(m−1) via the CPU bus 16 on line 27. An encoder or demultiplexer 28 receives the output of the AND gate 26 and outputs the input on one of lines 30a–30d, which correspond to each of the layers 23a–23d of upper register 21a. A selection signal on write select line 32 determines which of the layers the incoming lock bit will be written to. Shown at 33a–33d are each of the lock bits $Q_{P0}$, $Q_{P1}$, $Q_{P2}$, $Q_{P(m-1)}$, respectively, that correspond to the bit of upper register 21a associated with a particular shared resource R0, R1 . . . R(n−1). The default setting for bits $Q_{P0}$, $Q_{P1}$, $Q_{P2}$, $Q_{P(m-1)}$ is "0", unless a "1" is written to the bit by the demux 28, as described below. Multiplexer 34 receives bits $Q_{P0}$, $Q_{P1}$, $Q_{P2}$, $Q_{P(m-1)}$ as inputs and outputs one of the bits to the CPU bus 16 via line 35. A selection signal on read select line 36 determines which of the lock bits will be read out from multiplexer 34. An OR gate 37 receives each of the bits $Q_{P1}$, $Q_{P1}$, $Q_{P2}$, $Q_{P(m-1)}$ and outputs the logic results an access arbitration signal, on line 38. An inverter 39 receives the output of the OR gate 37 and provides the inverted signal to the AND gate 26. Alternatively, OR gate 37 and inverter 39 could be replaced with a NOR gate.

The arbiter 24 operates as follows. When any one of the processors P0, P1, P2 . . . P(m−1) needs to communicate with one of the shared resources R0, R1 . . . R(n−1), it sends a lock bit Q, having a value "1", to the arbiter 24 associated with the bit of the upper register 21a that corresponds to the particular shared resource. This lock bit Q is transmitted via the CPU bus 16 and the input line 27 to the AND gate 26. If none of the processors are currently locked to the resource, each of the lock bits $Q_{P0}$, $Q_{P1}$, $Q_{P2}$, $Q_{P(m-1)}$ at 33a–33d will be set to their default value "0". Therefore, the output of OR gate 37 on line 38 will also be a "0" and the output of inverter 39 will be a "1", which is also input to AND gate 26. Since both inputs to the AND gate 26 are "1", the output of the AND gate 26 will also be "1". When a processor sends a lock bit to the arbiter 24, it also sends a write select signal over write select line 32 to instruct the demux 28 to which bit 33a–33d the lock bit should be written. For example, if the processor that sent the lock bit is processor P0, the processor sends a write select signal to the demux 28 via write select line 32, to instruct the demux to write the lock bit $Q_{P0}$ to bit 33a, corresponding to the processor P0. In order to determine if processor P0 has obtained a lock on the shared resource, it then sends a read select signal to the multiplexer 34 to instruct it to output the lock bit $Q_{P0}$ from bit 33a. Processor P0 receives the "1" stored in bit 33a, which informs the processor P0 that it has obtained a lock with the shared resource. While the processor is communicating with the shared resource, because the bit $Q_{P0}$ is "1" and the remaining bits $Q_{P1}$, $Q_{P2}$, $Q_{P(m-1)}$ are "0", the output of OR gate 37 is "1". Accordingly, the output of inverter 39 is "0", causing the output of AND gate 26 to be "0". The "0" input to the AND gate 26 from the inverter 39 effectively blocks any of the other processors from obtaining a lock on the shared resource. This is because, even if another processor inputs its lock bit to the AND gate 26, the "0" input by the inverter 39 causes the output of the AND gate to be "0", which is then written to the processor's bit 33b–33d by the demux 28 based on the write select signal input to the demux 28 by the processor via write select line 32. Furthermore, when any other processor instructs multiplexer 34 to output its lock bit by sending its read select signal via read select signal 36, a "0" will be read out by the multiplexer 34 and sent to the processor via line 35, thus informing the processor that it does not have a lock on the shared resource.

When the processor P0 has completed its communications with the shared resource, it outputs a "0" to the AND gate 26 via CPU bus 16 and line 27. Alternatively, the processor may output a "1" to the AND gate 26 via CPU bus 16 and line 27. It also sends a write select signal to the demux 28 to instruct the demux to write the output of the AND gate 26 to bit 33a. In either case, since the output of the inverter 39 is "0", the output of the AND gate 26, and the input to the demux 28 is "0", which is written to bit 33a by the demux 28. This causes the output of the OR gate 37 to become "0" since all of the inputs are "0". The "1" output by the inverter 39 enables the next processor to input a "1" to the AND gate 26 to obtain a lock on the shared resource, because the output of the AND gate 26 will be a "1", which will be written to the bit 33a–33d of the processor that was first to input its lock bit after the lock from processor P0 was released.

In the event that a processor that has a lock on a shared resource exceeds a predetermined communication time or timeout, any of the other (non-locked) processors can set a release bit L of register 22 that corresponds to the particular shared resource that has been locked for longer than the timeout period. Setting the release bit L causes all of the lock bits $Q_{P0}$, $Q_{P1}$, $Q_{P2}$, $Q_{P(m-1)}$ stored in bits 33a–33d to be cleared to "0", thus releasing the processor that was lock beyond the timeout period.

Figure 3:
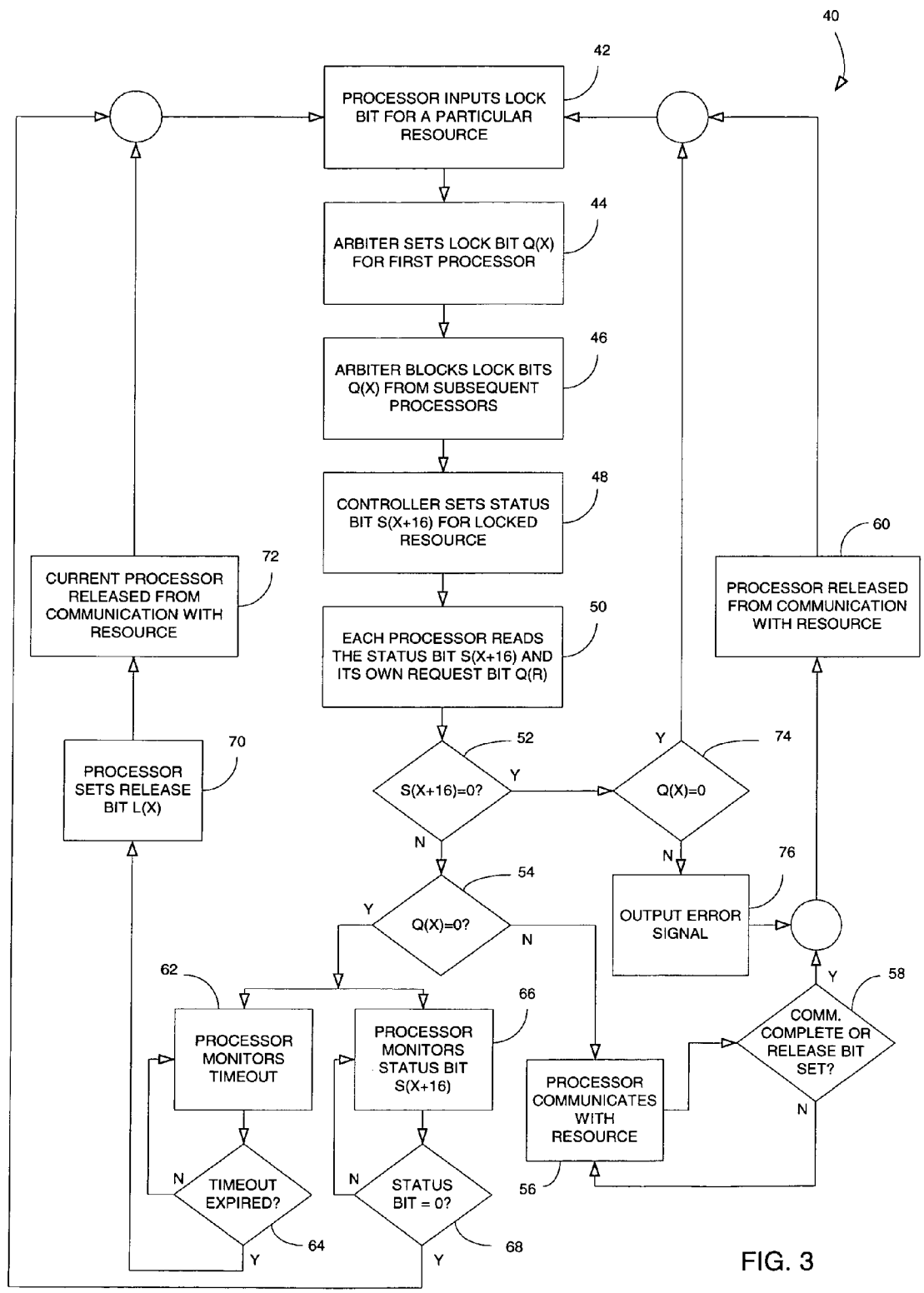
FIG. 3 is a flow diagram showing steps involved in the method of arbitrating access to a shared resource in accordance with the present invention.

FIG. 3 is a flow diagram 40 that shows the steps involved in the operation of the controller 10. When one of the processors, processor P0, for example, needs to access shared resource R1, it inputs its lock bit to the AND gate 26 of arbiter 24 associated with bit 1 of the upper register 21a, Step 42. As described above, the arbiter 24 sets the lock bit of the processor P0 if no other processors currently have a lock on the resource, Step 44, and blocks the lock bit if another processor already has a lock on the resource, Step 46. Since the processor P0 has obtained a lock on the resource R1, the controller 10 sets the status bit S(x+16)=bit 17 to indicate that resource R1 (where x=1) has been locked, Step 48. In Step 50, each processor that has requested a lock on resource R1 reads the lock bit Q associated with the inquiring processor. As described above, each processor reads its lock bit by addressing the multiplexer 34 to output the lock bit associated with the inquiring processor. If the processor requested a lock while no other processors were locked, the processor's lock bit would remain set, however, if another processor was locked at the time, the inquiring processor's lock bit would have been set to zero.

In Step 52, processor P0 reads the status bit S of resource R1 to determine if the resource R1 has been locked. Since it has been locked by processor P0, bit 17 of register 20 is set to 1. The process then proceeds to Step 54, where the processor P0 reads the lock bit $Q_{P0}$ from layer 23a of upper register 21a. Since the lock bit $Q_{P0}$ associated with processor P0 is set to 1, when the processor P0 addresses multiplexer 34 and reads the lock bit output there from, it reads the "1" that was previously set. Since both the status bit S and the lock bit $Q_{P0}$ are set to "1", meaning that the resource R1 is locked and that processor P0 has locked it, respectively, the processor P0 commences to access the resource R1, Step 56. The lock is maintained until either the access is completed or the release bit for the resource R1 is set, Step 58. When the access is completed or the release bit is set, Step 58, processor P0 is released from its lock with the resource R1, Step 60, and is then returned to Step 42, to compete for access to the resources.

If, when processor P0 attempts to set its lock bit in Step 42, another processor has already set its lock bit, Step 44, the arbiter 24 blocks the lock bit from processor P0, as described above, Step 46. The status bit S (bit 17) is set to one because the resource R1 is locked, Step 48. Accordingly, when processor P0 reads the status bit S and its own lock bit $Q_{P0}$ for the resource, Step 50, it reads that the status bit S is set to 1, Step 52, but that its own request bit $Q_{P0}$ is set to zero, Step 54. At this point, the process enters monitoring loops to monitor the status of the resource R1. In Step 62, the processor P0 monitors a timeout which begins when the processor accessing the resource R1 begins its access. It will be understood that the length of the timeout is set to accommodate the needs of the specific system in which the controller operates. If the timeout has not expired, Step 64, the processor continues to monitor the timeout. If the timeout has expired, Step 64, the processor P0 sets the release bit L for the resource R1, Step 70, which forces the locked processor to be released from its access to the resource R1, as described above, Step 72. The process returns to Step 42 where the processor P0 is able to compete for access to the resource R1.

The processor P0 also monitors the status bit S associated with the resource R1 to determine when the resource has been released by the currently accessing processor, Step 66. When the processor P0, by monitoring the status bit, determines that the resource R1 has been released, the process returns to Step 42 where the processor P0 is able to compete for access to the resource R1.

If, at Step 52, the status bit S for a resource is zero and, in Step 74, the processor's lock bit $Q_{P0}$ is also zero, no processors, including the inquiring processor, P0 in the above example, have access to the resource. The process returns to Step 42 where the processor is able to compete for access to the resource.

If, at Step 52, the status bit is zero, but for some reason, in Step 74, the processor's own lock bit Q $Q_{P0}$ is set to 1, the controller outputs an error signal to indicate an error state has been reached, as the status bit S indicates that the resource has not been locked by any processor, but the lock bit $Q_{P0}$ indicates that the processor has obtained a lock. The processor is then released, by setting its lock request bit Q $Q_{P0}$ to zero, Step 60, and the process then returns to Step 42 where the processor is able to compete for access to the resource.

Accordingly, the present invention enables a plurality of processors to share at least one resource, such as a memory device, without the competition or time concerns associated with software-based systems. By reading the lock bit Q associated with the processor and the status bit S of the resource, a processor is able to determine whether a particular resource is locked and whether it has access to the resource. The possible bit value combinations are shown in the following table:

|   | A | B | C | D |
|---|---|---|---|---|
| Q | 0 | 0 | 1 | 1 |
| S | 0 | 1 | 0 | 1 |

In case A, the lock bit Q and the status bit S are both zeroes. This indicates that the processor reading the bits does not have access or a lock to the resource (Q=0) and that no other processor has access (S=0). This case is shown in Steps 52 and 74 of FIG. 3.

In case B, the lock bit Q is zero and the status bit S is one. This indicates that the processor reading the bits does not have access or a lock to the resource (Q=0) but that another processor has access (S=1). This case is shown in Steps 52, 54 and 62–72 of FIG. 3.

In case C, the lock bit Q is one and the status bit S is zero. This indicates an error state. This case is shown in Steps 52, 74, 76 and 60 of FIG. 3.

In case D, the lock bit Q is one and the status bit S is one. This indicates that the processor reading the bits does have access or a lock to the resource (Q=1) and that the reading processor has access (S=1). This case is shown in Steps 52–60 of FIG. 3.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for arbitrating access to a shared resource comprising:

a plurality of microprocessors;

a shared resource; and a controller coupled to the plurality of microprocessors and the shared resource by a first bus and a second bus, respectively, the controller including a register having a lock portion associated with each of the plurality of processors and a status portion, each of the lock portions indicating whether the associated one of the plurality of microprocessors has obtained access to communicate with the shared resource, and the status portion includes a bit indicating whether any of the plurality of microprocessors has obtained access to communicate with the shared resource; and wherein each of the lock portions comprises an arbiter device which accepts lock bits input from each of the plurality of processors and outputs the lock bit of a processor that addresses the arbiter device.

2. The system of claim 1 wherein the shared resource comprises a memory device.

3. The system of claim 1 including a plurality of shared resources.

4. The system of claim 3 wherein the register includes at least as many lock portions and states portions as there are shared resources, wherein each shared resource has a lock portion and a status portion associated therewith.

5. The system of claim 1 wherein, when a particular processor requires access to the shared resource, it inputs a lock bit to the arbiter device.

6. The system of claim 5 wherein, if no processor other than the particular processor has input a lock bit to the arbiter device, the arbiter device accepts the lock bit from the particular processor and enables the particular processor to access the shared resource.

7. The system of claim 6 wherein, when access to the shared resources is enabled, a status bit in the status slice associated with the shared resource is set.

8. The system of claim 5 wherein, if a processor other than the particular processor has previously input a lock bit to the arbiter device, the arbiter device clears the lock bit from the particular processor to zero.

9. The system of claim 8 wherein, when access to the shared resources is enabled, a status bit in the status portion associated with the shared resource is set.

10. The system of claim 7 wherein, after the particular processor inputs its lock bit to the arbiter device, the particular processor addresses the arbiter device to read its lock bit from the output of the arbiter device and reads the status bit associated with the shared resource.

11. The system of claim 9 wherein, after the particular processor inputs its lock bit to the arbiter device, the particular processor addresses the arbiter device to read its lock bit from the output of the arbiter device and reads the status bit associated with the shared resource.

* * * * *